July 9, 1957            T. F. HALL            2,798,638
APPARATUS FOR MEASURING AND DISPENSING LIQUIDS
Filed June 20, 1955            2 Sheets—Sheet 2
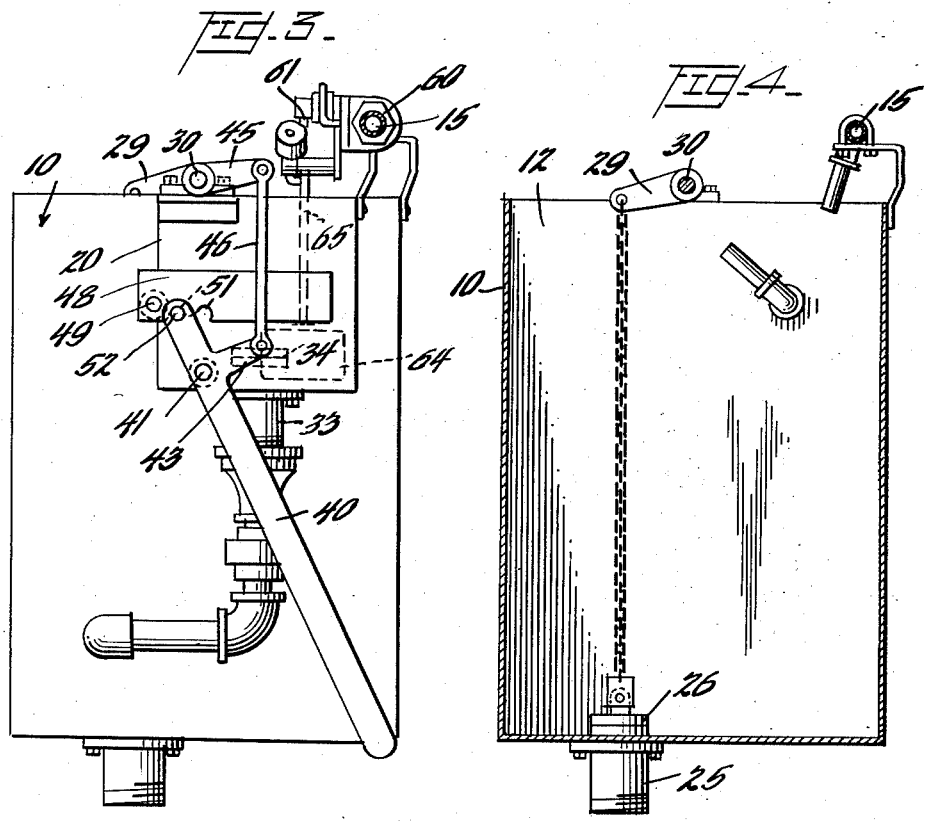
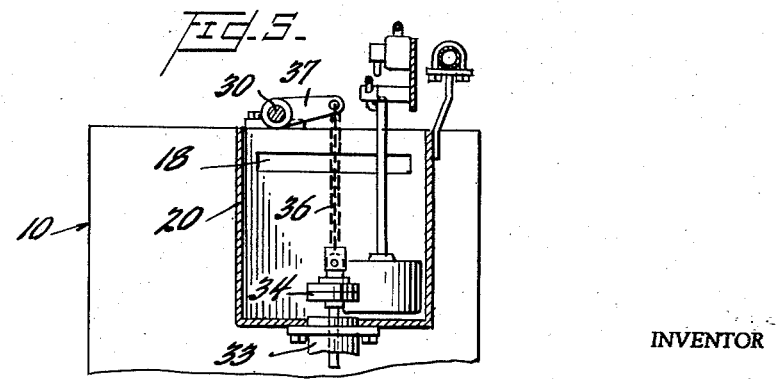
INVENTOR
Thomas F. Hall,
BY Watson, Cole, Grindle & Watson
ATTORNEYS

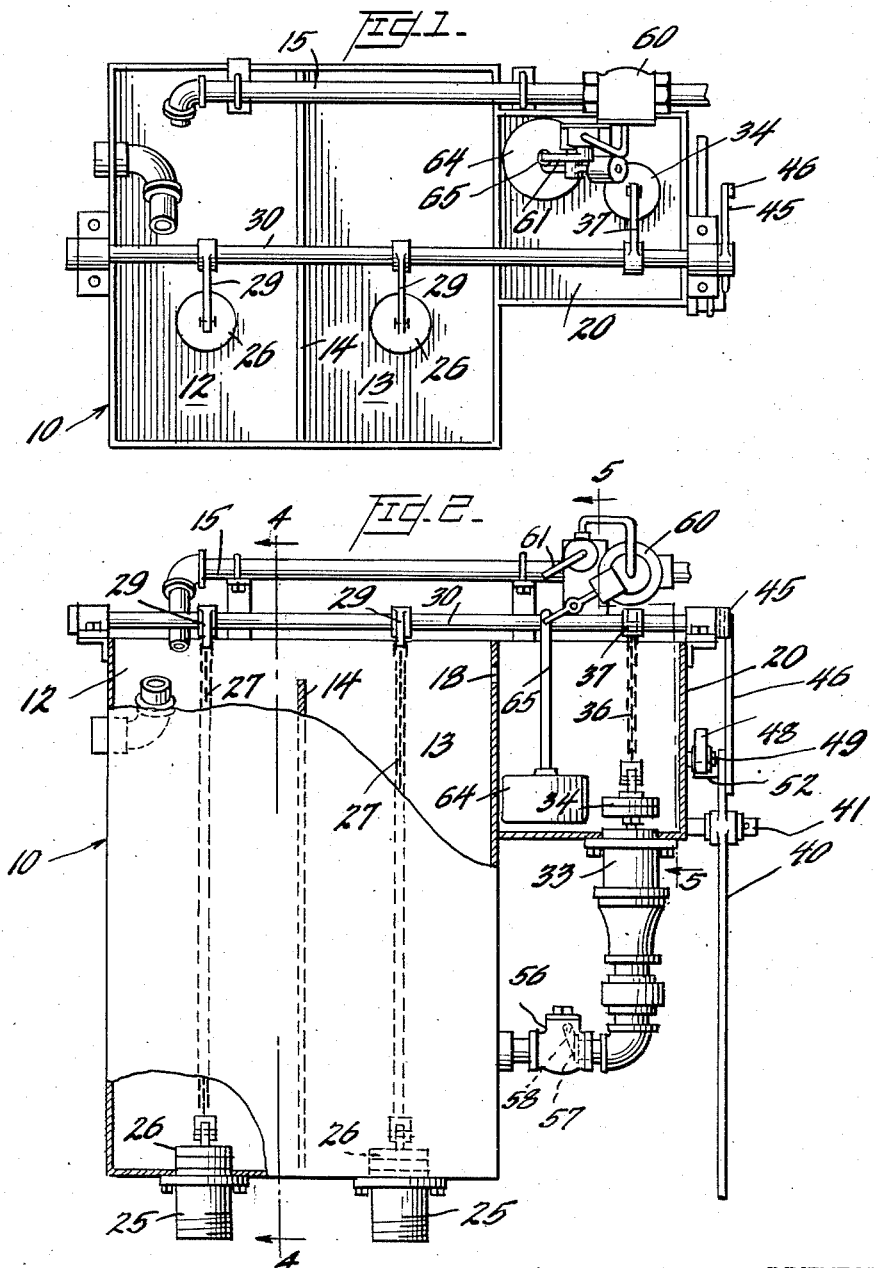

United States Patent Office 2,798,638
Patented July 9, 1957

2,798,638

APPARATUS FOR MEASURING AND DISPENSING LIQUIDS

Thomas F. Hall, New Smyrna Beach, Fla.

Application June 20, 1955, Serial No. 516,409

2 Claims. (Cl. 222—67)

This invention relates to improvements in apparatus for the measuring and dispensing of liquids and finds its primary application in the manufacture of ice by the freezing of water in containers of appropriate size and shape.

Thus, it is common practice in the manufacture of ice to charge the freezing containers or cans with a measured amount of water, to the end that ice blocks of standard size may be produced. For example, a block of ice weighing 300 pounds will require 37.5 gallons of water, and a block weighing 400 pounds will require 50 gallons of water. The use of measuring and dispensing equipment is, therefore, commonly used in ice plants to the end that the required amount of water may be determined with reasonable accuracy and conveniently discharged from the measuring equipment into the freezing can.

More specifically, it is an object of the invention to provide a simple and efficient measuring and dispensing apparatus for liquid, comprising one or more chambers into which the liquid to be measured is delivered, the flow of liquid into the chambers being so controlled that charging occurs at a maximum rate until the greater part of the required amount of liquid has been delivered, whereupon charging is rapidly and automatically terminated, so that the filling of the chambers is completed in a minimum period of time without sacrifice of accuracy of measurement.

It is a feature of the invention that termination of the filling of the measuring chambers is effected by control mechanism located in a separate control tank of substantially smaller volume than the volume of the chambers, the arrangement being such that when the chambers are nearly filled with the liquid, overflow of liquid into the control tank is permitted. Because of the relatively small size of the control tank, the liquid rises therein at a rapid rate, permitting termination of the charging of the chambers by conventional float-controlled valve mechanism with unusual accuracy and rapidity.

The invention further contemplates such control of discharge from the measuring chamber or chambers and from the control tank that the necessary cycle of operations may be initiated and controlled by manipulation of a single control lever, movable between two positions.

Further objects and features of the invention will be apparent from the following description taken in connection with the accompanying drawings, in which Figure 1 is a plan view of apparatus embodying the invention and illustrating the principles thereof;

Figure 2 is a partial sectional view taken in a vertical transverse plane;

Figure 3 is an end elevation of the apparatus, and

Figures 4 and 5 are views of details of the apparatus shown in the preceding figures.

To facilitate understanding of the invention, a single embodiment is shown in the drawing and specific language is used to describe the same. It will, nevertheless, be appreciated that no limitation of the scope of the invention is thereby intended, such further modifications, changes and alterations being contemplated as would normally occur to one skilled in the art to which the invention relates.

Since, as indicated hereinbefore, the invention finds its principal use in the measuring and dispensing of water in ice plants, in which the concurrent filling of a number of ice cans or containers is convenient and desirable, the invention is shown in its application to apparatus employing two filling chambers for the concurrent filling of two freezing containers. It will be appreciated, however, that a unit employing a single chamber only, or a number of chambers in excess of two, will operate similarly to the unit here illustrated, control being in all cases effected by a common control unit.

Thus, as will be seen from Figure 2 of the drawing, the measuring tank 10 in which the water or other liquid is received and measured is divided into separate chambers 12 and 13 by an intervening partition 14. By the simple expedient of enlarging the overall dimensions of the tank 10, and employing additional partitions, a greater number of chambers may be provided. By discharging the liquid from the inlet conduit 15 into that chamber which is farthest from the control tank 20, and allowing the liquid to flow over the partition from the remote chamber into the next adjacent one, the chambers will be successively filled, that chamber communicating with the control tank 20 being the last to be filled, whereby complete filling of all chambers prior to termination of charging is assured.

Preferably the control tank 20 is located immediately adjacent the measuring tank and communicates with the next adjacent chamber 13 through an elongated opening or port 18, formed in the wall or walls separating the same, but under some circumstances it may be more convenient to provide a connecting conduit between the chamber 13 and the control tank 20, affording it passage therebetween, with the control chamber disposed elsewhere. Alternatively, a partition like partition 14 may separate the chamber 13 from the control tank 20. It will be noted that the lower edge of the opening or port 18 through which liquid overflows from the measuring tank 10 into the control tank 20 is disposed substantially at the same level as the upper edge of the partition 14, so that in the charging of the chambers and the ultimate overflowing of liquid into control tank 20, the final level of liquid in all of the chambers will be equal.

Each chamber 12, 13 is provided at or adjacent its lower end with a discharge outlet 25, preferably comprising a threaded nipple for connection to a filling hose or the like, and each outlet is provided with a discharge closure valve 26 which may be lifted for the purpose of discharging liquid simultaneously from the chambers by means of lift chains 27 depending from arms 29 secured to and extending outwardly from valve control shaft 30.

Similarly, a discharge outlet 33 is provided in the lower portion of the control tank 20, a discharge closure valve 34 being associated with the outlet and being controlled from the valve control shaft 30 by a lift chain 36 connected to an arm 37 secured to and extending outwardly from the shaft 30, the arm 37 extending in the opposite direction from the arms 29, whereby the valve 34 is opened and the valves 26 are closed when the shaft 30 is rotated in a counter-clockwise direction, as viewed in Figure 3, and the valves 26 are opened and the valve 34 is closed when the shaft 30 is rotated in the opposite direction.

Rocking of shaft 30 to control the several discharge valves as indicated may be achieved in a variety of ways. In the drawing, discharge valve operation is effected by manipulation of a lever 40, pivoted at 41 to the end wall of the control tank 20 and provided with an arm 43. An arm 45 on control shaft 30, extending in the same direction from the shaft as arm 37, is pivotally connected with arm 43 by a link 46. Thus, when the lever 40 is in the position in which it is shown in Figure 3, the shaft 30 occupies its counterclockwise position, the valve 34 is opened, and the valves 26 are closed. If the lever 40 be swung to the left, the shaft 30 will be rocked in a clockwise direction to close valve 34 and open valves 26. Any conventional means may be employed to retain the lever 40 against unintentional displacement from either position. I have shown a latch 48, pivoted at 49 to the end wall of the control tank 20, and having at its lower side a pair of semi-circular notches 51 dimensioned to receive a pin 52 mounted in the upper end of the lever 40, whereby the lever is retained in either position by the weight of the latch 48.

The discharge outlet 33 for the control tank 20 communicates with the measuring tank 10 at a point below the control tank through a one-way valve 56. This valve may be a conventional check valve, provided with a valve element 57 supported on a pivoted arm 58, whereby liquid is permitted to flow from the control tank outlet 33 into the measuring tank 10, flow in the opposite direction being blocked by seating of the valve.

The inlet conduit 15 is provided with a valve 60 controlled by a lever 61 from a float 64 through rod 65. Valve 60 may be of any conventional type, capable of displacement from the opened to the closed position by the application of a small force, such as the usual flush valve, and the details thereof form no part of the invention.

The function of the apparatus will now be apparent. Assuming that the parts are in the position in which they have just been placed by moving the lever 40 to the right, the discharge valve 34 for the control tank 20 is opened and the tank has discharged through valve 56 into the measuring tank 10, the discharge valves 26 are closed, and the measuring tank 10 is being filled through inlet pipe 15, valve 60 being open. The liquid rises in tank 10, filling first chamber 12 and then chamber 13 until it reaches the level of the port 18, the tank 10 having thus been filled at the maximum rate. Thereafter the liquid overflows through port 18, quickly filling control tank 20 to raise float 64 and close valve 60 to terminate the supply of liquid. Although discharge valve 34 for control tank 20 is open, liquid does not discharge from outlet 33 into measuring tank 10, because the level of liquid in the latter is much higher.

The chambers 12 and 13 are now filled, charging has been terminated, and the discharge through outlets 25 is initiated by shifting lever 40 to the left to rock valve control shaft 30 in a clockwise direction. Valve 34 is now closed to retain the liquid in the control tank 20, thus maintaining valve 60 in closed position. Concurrently, valves 26 are opened and discharge is continued until chambers 12 and 13 are empty. Lever 40 is thereupon displaced to the right, raising valve 34 to permit discharge of the contents of control tank 20 into chamber 13, and closing valves 26 to prevent discharge from measuring tank 10. As control tank 20 drains rapidly, float 64 falls promptly to open valve 60, whereby the filling of measuring tank 10 is again initiated.

It will be perceived that with the use of this mechanism, charging of measuring tank 10 at the maximum rate proceeds until the level of liquid approaches the upper end of the tank and begins to overflow into control tank 20 through port 18. Throttling of valve 60 as the latter is closed occurs only during the relatively short period of time required for the filling of control tank 20 to the extent necessary to complete the closing of valve 60, which period may be made as small as desired by the use of a control tank of small volume and the employment of an inlet valve which is capable of moving from fully opened to fully closed position upon minimum upward displacement of float 64.

Having thus described the invention, what is claimed as new and desired to be secured by Letters Patent is:

1. Apparatus for measuring and discharging water into freezing containers in the manufacture of ice, comprising, in combination, a measuring tank, at least one partition extending across said tank to provide therein separate chambers, an inlet conduit supplying liquid to one of said chambers, an inlet valve in said inlet conduit, a control tank, a float in said control tank, operative connections between said float and said inlet valve to close the valve as said float rises, each of said chambers and said control tank being provided with a discharge outlet and a discharge valve therefor, operating means for controlling said discharge valves whereby the chamber valves are opened when the control tank valve is closed, means affording communication between the upper end of each of said chambers and said control tank, said inlet conduit discharging into that chamber remote from said control tank, whereby liquid rising in said chamber may overflow from the remote chamber into the next chamber and thence into said control tank to raise the float and close the inlet valve, and means including a one-way valve permitting discharge of liquid from the discharge outlet of said control tank into said measuring tank, said control tank being of substantially smaller volume than said measuring tank, whereby said measuring tank may be filled at the maximum rate over the major portion of the filling cycle prior to throttling of the inlet valve.

2. In apparatus for measuring and dispensing liquids, the combination with a measuring tank, of an inlet conduit supplying liquid to said tank, an inlet valve in said conduit, a control tank, a float in said control tank, operative connections between said float and said inlet valve to close the valve as the float rises, said measuring tank and said control tank each being provided with a discharge outlet and a discharge valve therefor, operating means for controlling said discharge valves whereby one is opened when the other is closed, means affording communication between the upper end of said measuring tank and said control tank, whereby liquid rising in said measuring tank may overflow into said control tank to raise the float and close the inlet valve, and means including a one-way valve permitting discharge of liquid from the discharge outlet of said control tank into said measuring tank, said control tank being of substantially smaller volume than said measuring tank, whereby said measuring tank may be filled at the maximum rate over the major portion of the filling cycle prior to throttling of the inlet valve.

References Cited in the file of this patent

UNITED STATES PATENTS

| | | |
|---|---|---|
| 1,826,704 | Byrne | Oct. 13, 1931 |
| 1,879,051 | Blood | Sept. 27, 1932 |